Feb. 27, 1923.
G. E. CORSON.
DRAG SAW CLAMPING DEVICE.
FILED APR. 19, 1920.
1,446,452.
2 SHEETS—SHEET 1.
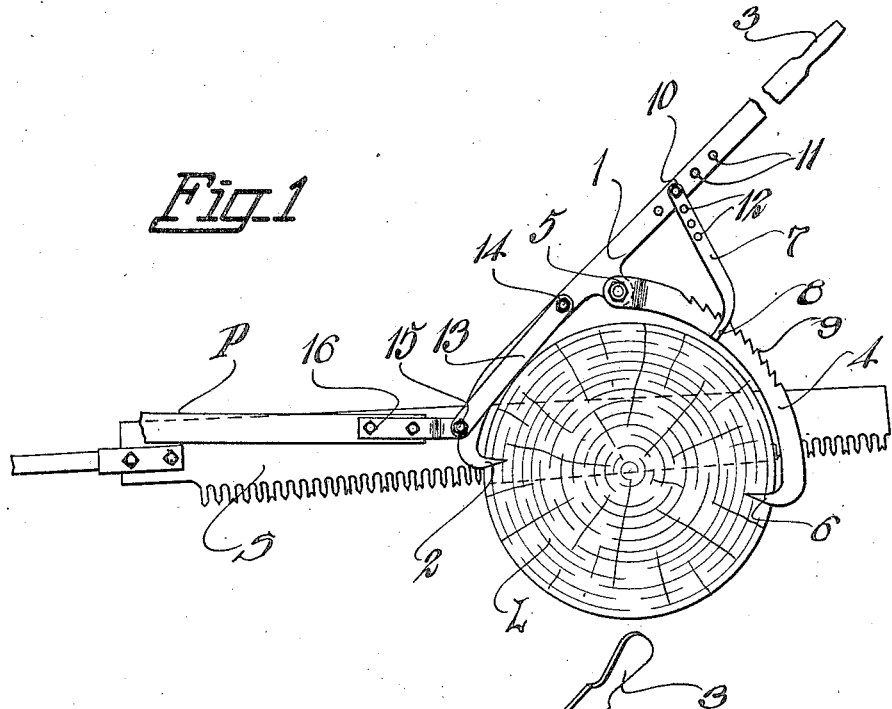
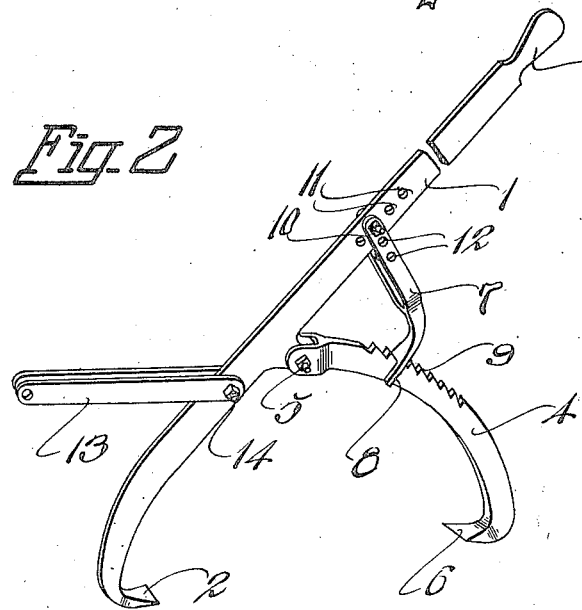
Inventor
George E. Corson
By Herbert E. Smith
Attorney Feb. 27, 1923.

G. E. CORSON.
DRAG SAW CLAMPING DEVICE.
FILED APR. 19, 1920.

Inventor
George E. Corson

By Herbert E. Smith
Attorney

Patented Feb. 27, 1923.

1,446,452

UNITED STATES PATENT OFFICE.

GEORGE E. CORSON, OF RATHDRUM, IDAHO.

DRAG-SAW CLAMPING DEVICE.

Application filed April 19, 1920. Serial No. 374,347.

*To all whom it may concern:*

Be it known that I, GEORGE E. CORSON, a citizen of the United States, residing at Rathdrum, in the county of Kootenai and State of Idaho, have invented certain new and useful Improvements in Drag-Saw Clamping Devices, of which the following is a specification.

My present invention relates to improvements in drag saw clamping devices designed especially for use in cutting fallen timber, and adapted to afford a support or foundation or base for a power driven, portable, sawing machine, of the drag saw type. The primary object of the invention is the provision of an attaching device applicable to the fallen timber to be sawed, for supporting the saw and its motor, which device is comparatively simple in construction and operation, light in weight, strong, and durable, and efficient in performing its required functions.

To this end the invention consists in certain novel combinations and arrangements of parts whereby the attaching device, when applied to a log or fallen timber, supports one end of the platform for the saw machine motor, by its connection with the log or timber, while the other end of the platform is properly supported from the ground.

In the accompanying drawings I have illustrated the physical embodiment of my invention in which the parts are combined and arranged according to the best mode I have so far devised for the practical application of the principles of my invention.

Figure 1 is a view in side elevation illustrating the subject matter of my invention in operative position and attached to a log to be sawed, part of the saw and part of the machinery supporting platform being indicated.

Figure 2 is a perspective view of the device, detached.

Figure 3:
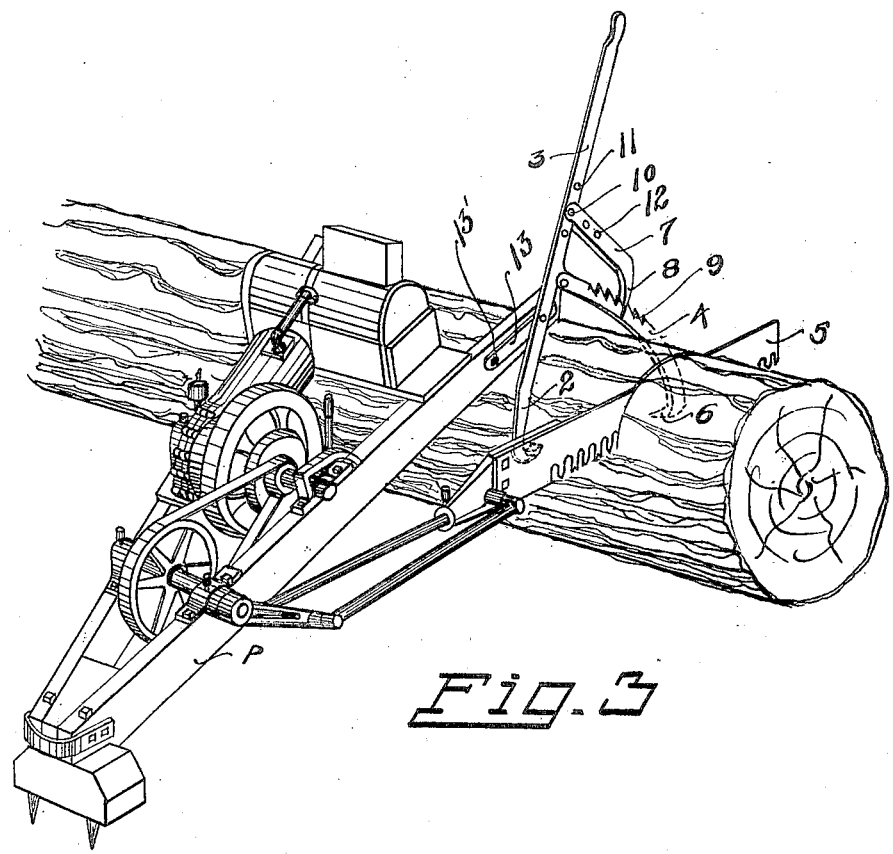
Figure 3 is a perspective view of a well known type of drag saw, with the clamping device of my invention shown applied thereto in operative position.

The invention is particularly applicable for use in sawing fallen timber or logs as indicated at L, and a saw S of the drag saw type is supported from the platform P, the saw and platform forming parts of a portable sawing machine of well known type for sawing timber in the forests. In actual use, the platform upon which the saw machinery is supported, as indicated at P, is of V-shape, lying horizontal with the diverging ends of the platform supported from the ground by suitable posts or uprights, while the apex end of the platform is directly supported from the log L, in order that the saw S may be operated or reciprocated by its motor.

In Figure 3 the position of the saw platform or frame P is reversed, and the legs of this well known type of saw frame or platform are resting on the log with the apex end of the platform supported from the ground.

For attaching the platform and supporting it from the log I utilize the device of my invention, which is manually operable through the instrumentality of the lever 1 of suitable dimensions, and provided with a rigid end jaw 2 having a sharpened chisel edge to engage and enter the log as indicated. The handle end 3 of the lever is of sufficient length to afford the application of the required manual power in locking or securing the attachment to the log, and the lever is equipped with a hinged jaw or lever arm 4 pivoted at 5 to the lever, the chisel edge 6 of the jaw being adapted to enter the log opposite to the fixed jaw as seen in Figures 1 and 3. Thus it will be seen that in applying the device to a log, the lever and lever arm are spread to embrace the log, and then by pulling on the lever, to the left in Figures 1 and 3, the two sharpened edges of the jaws are caused to enter the log at opposite sides, thus embedding the jaws in the log as a support for the platform.

The lever and its hooked arm are held in locked position by means of the pawl or dog 7 having a forked end 8 to engage over the lever arm with one of the rack teeth 9 thereon. By means of the pivot pin 10, and selected holes 11 in the lever and 12 in the pawl, the latter may be adjusted to various conditions when the attachment is locked to different sizes of logs, thus either shortening or lengthening the reach of the pawl to engage various teeth of the rack on the lever arm. The pawl holds the two members 1 and 4 of the device rigidly and securely in place, and the attachment thus affords a stable support for the platform P as in Figures 1 and 3. In Figure 1 the platform is suspended at its pointed end from the lever by means of a pair of links 13, 13, pivoted at 14 to the lever, and similarly pivoted at 15 to the clevis or attaching irons or straps 16 that are bolted to the platform P.

Inasmuch as a slight movement of the supporting platform results in deranging the saw machinery, with the consequent binding or possible breaking of the saw, it is absolutely essential that the platform be supported with stability and rigidity from the ground and from the log. This desired result is accomplished by the utilization of my device, which not only holds the platform as a substantial foundation for the machinery, but prevents the log from rolling, or otherwise moving, and the natural tendency of the load of the platform or frame to pull down on the lever in Figure 1 also assists in holding the lever and its arm in engagement with the log. The forked or bifurcated ends of the pawl in conjunction with the lever and lever arm assist in holding these parts alined and prevent wabbling of lateral shifting, and the two links 13 connecting the lever and clevis, together with the lever, which they embrace, hold the pointed end of the platform rigid and stable.

In Figure 3 where the ends of the platform or A-frame are shown resting on the log, a link 13 is pivoted to one leg of the platform, and it will be apparent that the clamp device of the invention may readily be adapted to logs of different diameters, the platform being raised or lowered corresponding to the diameter of the log. The link 13 in such adjusting operations will swing on its pivot point at 13' and of course the jaws 2 and 6 are spread apart or brought together as required.

Having thus fully described my invention, what I claim as new and desire to secure by Letters Patent is:

1. The combination with the supporting platform of a lever and pivotal link connection between the platform and lever, said lever having a jaw adapted to engage a log as described, a second jaw pivoted on said lever and opposed thereto in its action on the log, and means for holding said lever and pivoted jaw member in locked position.

2. The combination with a supporting platform, of a lever and a pivotal link connection between said lever and platform, a divergent lever arm pivoted on the lever, sharpened jaws at the end of the lever and lever arm respectively, a pawl pivoted on the lever, rack teeth on the lever arm to co-act with said pawl, and means for adjusting the pivotal support of the pawl.

3. The combination in a portable sawing machine attachment with a supporting platform, of a straight arm lever having a sharpened hooked end, a clevis on the platform, a pair of links pivoted to the lever and to the clevis and located at the sides of the lever, a lever arm pivoted to the lever and formed with rack teeth, a sharpened hook-end on the lever arm, a pivoted pawl on the lever adapted to engage the teeth of the lever arm, and said lever and pawl provided each with a series of pivot openings for the purpose described.

In testimony whereof I affix my signature.

G. E. CORSON.